(12) United States Patent
Parker (10) Patent No.: US 7,298,975 B2
(45) Date of Patent: Nov. 20, 2007

(54) SYNCHRONOUS COLLAPSED RING ARCHITECTURE FOR REAL-TIME SIGNAL SWITCHING AND DISTRIBUTION

(75) Inventor: Steven E. Parker, Waco, TX (US)

(73) Assignee: L-3 Communications Integrated Systems L.P., New York, NY (US)

(*) Notice: Subject to any disclaimer, the term of this patent is extended or adjusted under 35 U.S.C. 154(b) by 1125 days.

(21) Appl. No.: 09/904,289

(22) Filed: Jul. 12, 2001

(65) Prior Publication Data

US 2002/0028038 A1    Mar. 7, 2002

Related U.S. Application Data

(60) Provisional application No. 60/218,362, filed on Jul. 13, 2000.

(51) Int. Cl.
*H04B 10/20* (2006.01)
*H04J 4/00* (2006.01)
*H04J 14/00* (2006.01)

(52) U.S. Cl. .................. 398/66; 398/58; 398/59; 398/61; 398/75

(58) Field of Classification Search .......... 398/3, 398/4, 59, 66, 70, 71, 75, 98, 99, 58, 61, 398/63
See application file for complete search history.

(56) References Cited

U.S. PATENT DOCUMENTS

| | | | | |
|---|---|---|---|---|
| 4,482,980 A | * | 11/1984 | Korowitz et al. | 714/712 |
| 4,628,501 A | * | 12/1986 | Loscoe | 398/61 |
| 4,893,302 A | * | 1/1990 | Hemmady et al. | 370/427 |
| 5,003,531 A | | 3/1991 | Farinholt et al. | 370/16.1 |
| 5,206,857 A | * | 4/1993 | Farleigh | 370/452 |
| 5,469,283 A | * | 11/1995 | Vinel et al. | 398/71 |
| 5,483,535 A | * | 1/1996 | McMillen et al. | 370/452 |
| 5,517,232 A | * | 5/1996 | Heidemann et al. | 725/98 |
| 5,550,820 A | * | 8/1996 | Baran | 370/395.5 |
| 5,638,512 A | | 6/1997 | Osman et al. | 395/187.01 |

(Continued)

FOREIGN PATENT DOCUMENTS

WO    WO 97/41650    6/1996

(Continued)

OTHER PUBLICATIONS

Kilm, T., et al, "Flexibility and Quality in the Access Network", Discovering a New World of Communications, Chicago, Jun. 14-18, 1992, bound together with B0190700, vol. 3, Proceedings of the International Conference on Communications, New York, IEEE, US, vol. 4, Jun. 14, 1992, pp. 1864-1868, XP010061848.

(Continued)

*Primary Examiner*—M. R. Sedighian
(74) *Attorney, Agent, or Firm*—O'Keefe, Egan, Peterman & Enders, LLP (57) ABSTRACT

A method and system includes at least one interconnect hub, connecting the at least one interconnect hub to a plurality of audio connection devices to form a network of audio connection devices with the interconnect hub at the center of the ring. The audio connection devices are connected to each other through the at least one interconnect hub, and data is synchronously transmitted between at least two of the audio connection devices through the at least one interconnect hub.

9 Claims, 7 Drawing Sheets

U.S. PATENT DOCUMENTS

| | | | | |
|---|---|---|---|---|
| 5,706,278 | A | * | 1/1998 | Robillard et al. ........... 370/222 |
| 5,745,269 | A | * | 4/1998 | Chawki et al. ............... 398/59 |
| 5,757,801 | A | * | 5/1998 | Arimilli ...................... 370/444 |
| 5,909,431 | A | * | 6/1999 | Kuthyar et al. ............. 370/260 |
| 6,226,296 | B1 | * | 5/2001 | Lindsey et al. ............. 370/401 |
| 6,577,414 | B1 | * | 6/2003 | Feldman et al. ............. 725/129 |
| 6,611,537 | B1 | * | 8/2003 | Edens et al. ................ 370/503 |
| 6,834,057 | B1 | * | 12/2004 | Rabenko et al. ............ 370/468 |

FOREIGN PATENT DOCUMENTS

WO     WO 99/63698     5/1999

OTHER PUBLICATIONS

International Search Report dated Apr. 5, 2002 for PCT/US01/22147 filed Jul. 13, 2001.

* cited by examiner

SYNCHRONOUS COLLAPSED RING ARCHITECTURE FOR REAL-TIME SIGNAL SWITCHING AND DISTRIBUTION

RELATED APPLICATION

This application claims the benefit of U.S. provisional application Ser. No. 60/218,362, filed Jul. 13, 2000, entitled *Synchronous Collapsed Ring Architecture Method and System for Real-Time Signal Switching and Distribution.*

TECHNICAL FIELD OF THE INVENTION

This invention relates in general to the field of communications, and more particularly to a method and system for synchronous collapsed ring architecture for real-time signal switching and distribution.

BACKGROUND OF THE INVENTION

Commercial and military aircraft provide fast, reliable, and efficient means for transportation of people and cargo. For the military, aircraft provide strategic military capabilities. Communications systems within all aircraft are essential to ensure, proper operation of the aircraft, deployment of personnel, and strategic sufficiency.

Modern aircraft communications systems have many requirements, with most of these requirements applicable in military and non-military contexts. For example, aircraft communications systems, as well as land-based systems, should have growth capacity, be flexible to adaptation, provide secure communications, and meet suitable space and weight requirements. Of course, such systems must also be reliable and be able to interface with a wide variety of equipment, such as radios, cryptographic devices, headsets and speakers, and video devices.

Despite these needs, many aircraft platforms use noisy, unreliable, and expensive analog communications systems. Such systems are employed in military and non-military aircraft and non-aircraft communications systems.

Therefore, a need has arisen for a method and system that overcomes the disadvantages and deficiencies of the present day communications systems.

SUMMARY OF THE INVENTION

The present invention relates to a method and system for communicating information that addresses disadvantages of prior systems and methods.

In accordance with the present invention, a method for communication comprises providing at least one hub, connecting the at least one hub to a plurality of audio connection devices to form a ring. The audio connection devices with the hub at the center of the ring, wherein the audio connection devices are connected to each other through the at least one hub, and synchronously transmit data between at least two of the audio connection devices through the at least one hub.

According to another embodiment of the invention a communications system comprises a star network having a hub located at the center of the star network. The star network carries a synchronous data stream.

Embodiments of the present invention provides various technical advantages. For example, one embodiment of the invention utilizes 155 Mb/s fiber-optic based architecture designed to handle multiple data types simultaneously and provides large signal capacity such as greater than 1000 channels of 4 KHz audio, greater than 256 Wideband (20 KHz+) channels, and multiple video or data channels.

According to another embodiment, the invention comprises a communications system and method that provides binaural sound, thereby providing spatial placement of audio channels to aid operator comprehension when listening to multiple audio channels. Furthermore, one embodiment of the invention utilizes DSP-based audio processing to provide flexibility to handle special audio processing needs (filters, mixing, etc).

According to another embodiment of the invention, a communications system and method are provided that include built-in redundancy and fault tolerance for high utilization reliability. Also, advanced conferencing capabilities are provided, resulting in substantially unlimited conference channels and also provides point to point calling.

Communications systems in accordance with the invention are also fully red/black compliant and are designed to meet Tempest requirements. Communications systems of the present invention are based on industry open standard interfaces and technology, compatibility with COTS equipment, thereby enhancing affordability and minimize upgrade/modification costs, and enhance technology longevity and stability.

Other advantages may be readily ascertainable by those in the art and the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF EMBODIMENTS OF THE INVENTION

Embodiments of the invention and its advantages are best understood by referring to FIGS. 1 through 7D of the drawings, like numerals being used for like and corresponding parts of the various drawings.

Figure 1:
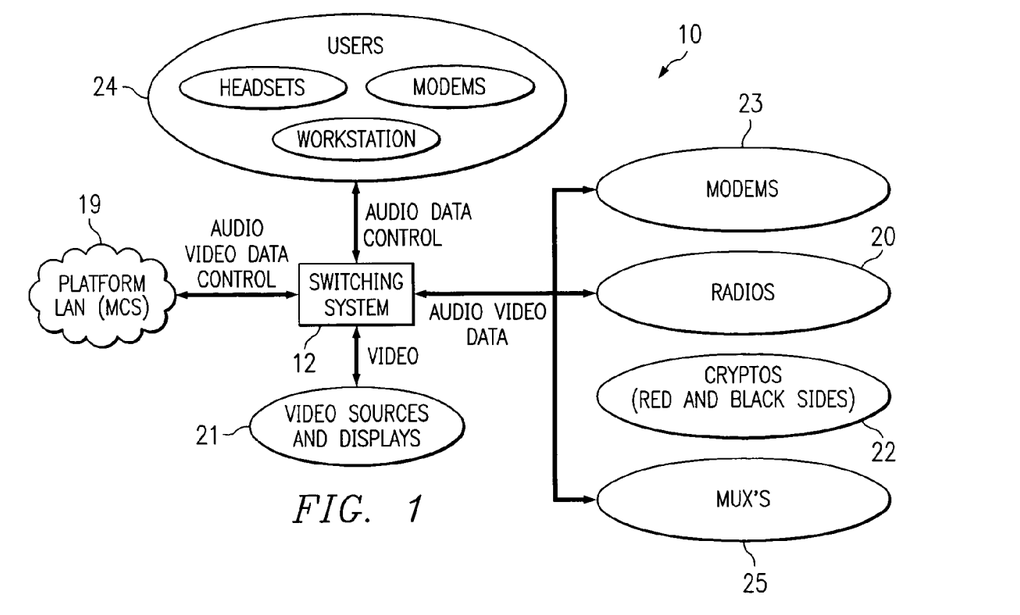
FIG. 1 is a block diagram of a communications network according to the teachings of the invention.

FIG. 1 is a block diagram of a communications network 10, including a Fiber Optic Ring Connected Equipment (FORCE) system 12 according to the teachings of the invention. According to one embodiment, the system 12 is a modern second generation, fully digital, fiber optic based audio switching and distribution system. According to one embodiment, the FORCE system 12 functions to tie all of the audio sources and destinations on a given platform together, and distribute data and signals as required to meet the utilization needs of the network 10. As such there are several discrete functions that are provided by the FORCE system 12 according to one embodiment. Generally, these function are achieved by combining a star physical configuration with a synchronous TDMA data stream in a logical ring architecture. The following paragraphs describe these functions.

The FORCE system 12 interfaces and controls a wide variety of equipment, including the following:

Radios 20: HF, UHF, VHF, SATCOM, and Navigational radios. Control for this equipment nominally means activation of Push-To-Talk (PTT) lines and assorted mode discretes.

Cryptographic Device (CRYPTO) 22: KY-58, ANDVT, KY-75, and STU III, for example. The system interfaces to both the Red and Black sides of the device, and can interconnect any selected CRYPTO device in line with any compatible radio. This allows a single CRYPTO device 22 to be dynamically assigned to any radio without the use of external relays or switching boxes. The FORCE system 12 handles the discrete interface and handshaking with the CRYPTO device 22.

User Workstations, Modems, Headsets and Speakers 24: The FORCE system 12 interfaces to a wide variety of headsets, and has been specifically designed to take advantage of stereo headsets when available to provide binaural sound. The system 12 handles multiple PTT signals, and easily handles aircraft control centers that utilize separate PTTs for interphone and radio access. Fully adjustable VOX capabilities as well as automatic gain control (AGC) are provided on all channels. The FORCE system 12 supports Active Noise Reduction (ANR) headsets as well. Loudspeaker drivers (not shown) are provided for public address/broadcast needs.

The FORCE system 12 provides an open architecture and extra bandwidth to handle a wide variety of non-traditional signals, such as video and serial data, for example, as included within video sources and displays 21.

The FORCE system 12 supports a virtually unlimited number of simultaneous conferences, including both operators and equipment. The following are the major features of conferences available with the FORCE system 12:

Because the FORCE system 12 creates conferences digitally, the number of conference channels the system supports is virtually unlimited. The primary limitation on the number of conferences provided in a system is the access provided to the operator by the operator control panel.

The FORCE system 12 also supports having all users on a single conference channel, or any subset thereof. Conferences can also include radios and other equipment, and may be secure or clear. Specified conferences can be restricted to a subset of users, if desired.

In addition, the FORCE system 12 supports signaling on a station by station basis as part of a platform LAN 19. A fixed group of stations (or an individual) can be signaled by transmitting a tone to an ear/speaker and/or flashing a light on a control panel.

Further, the FORCE system 12 supports fixed/ringing conferences to signal a fixed group of stations designated for the conference whenever the conference is activated. A user on the FORCE system 12 can also build a conference dynamically, by signaling individual users and then adding the users into a conference, similar to building a teleconference using a standard phone system.

The FORCE system 12 allows any combination of audio channels to be monitored at any or all stations. When monitoring, each channel has individually adjustable volume and azimuth (when using binaural headsets) settings. Certain channels (i.e., aural warnings, PA) can be configure to always monitor at high (+6dB) levels.

The FORCE system 12 has built-in support for point-to-point calling. Any node on the ring can signal ("Dial") and exclusively talk to another node in the system. This includes call hold, call waiting, caller ID, and busy signaling capabilities. In addition, all nodes in the system have real-time access to the conference, monitor, and calling status of all other nodes on the ring.

The FORCE system 12 also handles many non-audio signals, including data signals and special purpose wideband signals by modems 23 and multiplexers 25. For these signals, the system 12 provides the capability to digitize and route signals in a one-to-one or one-to-many mode.

Figure 2A:
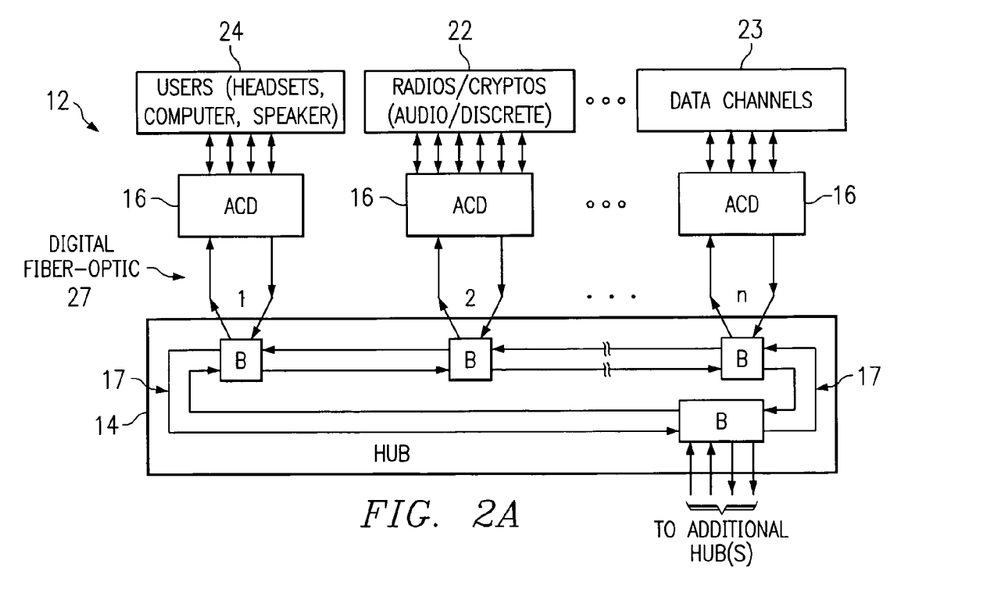
FIG. 2A is a block diagram of the switching system shown in FIG. 1.
Figure 2B:
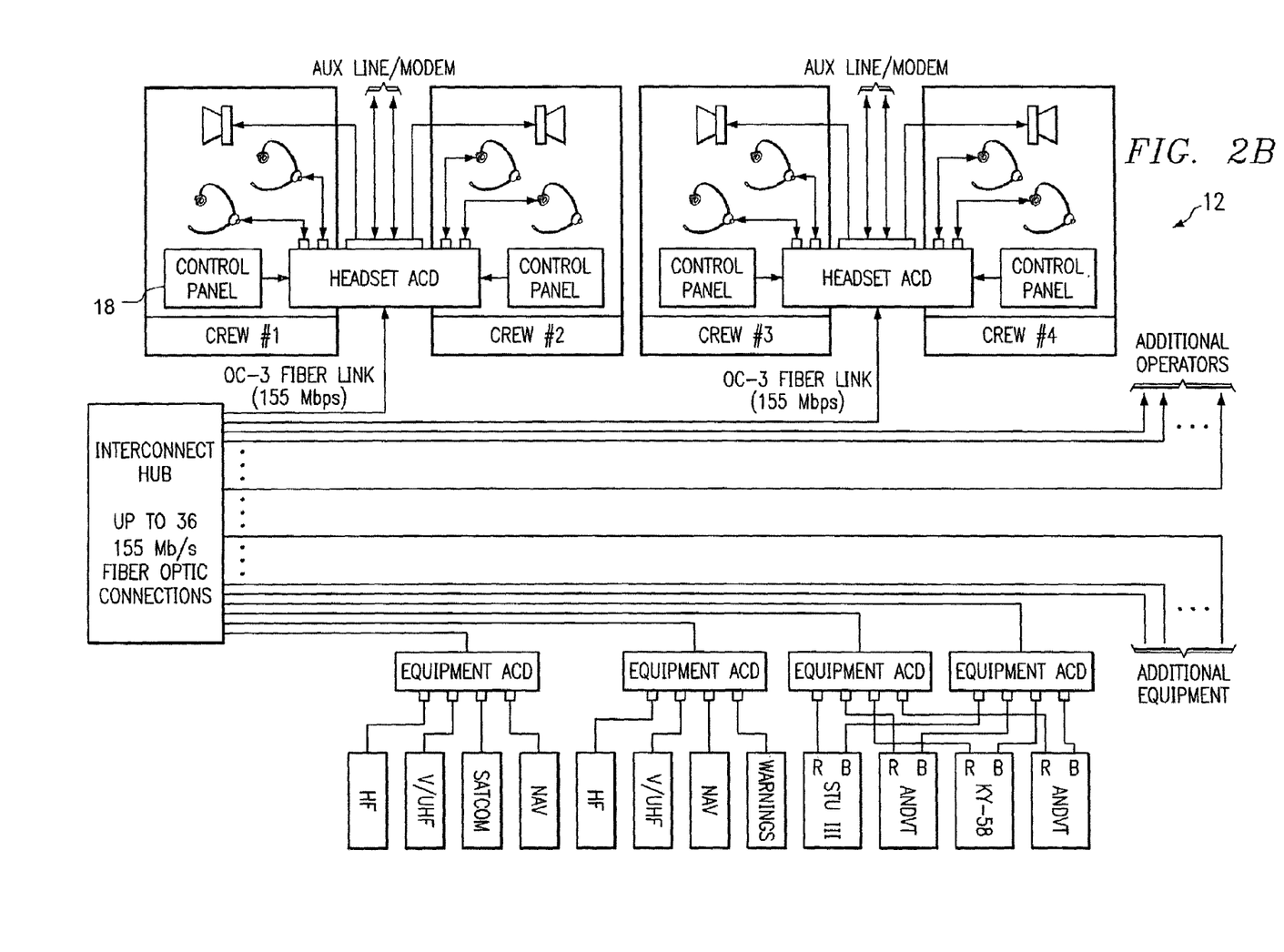
FIG. 2B is another block diagram of the switching system shown in FIG. 1, showing additional details of the switching system.

The operation and structure of the FORCE system 12 is described below in conjunction with FIGS. 2A through 7. FIG. 2A is a block diagram of the FORCE system 12 shown in FIG. 1, constructed according to the teachings of the invention, and FIG. 2B is another block diagram of the FORCE system 12 shown in FIG. 1, showing additional details of the system.

The FORCE system 12, according to the embodiment illustrated in FIG. 2A and 2B, includes three major components: an interconnect hub 14, audio connection devices (ACDs) 16, and control panels 18 (FIG. 2B), to be described in greater detail below in conjunction with subsequent FIGURES.

In this embodiment, interconnect hub 14 is a ¾ ATR, 36 port box at the center of the system, and ties together all of the ACDs 16 in the system. Multiple interconnect hubs 14 may be tied together to provide additional flexibility or survivability if desired. It should be understood the interconnect hubs 14 of other sizes may also be used. An example for multiple interconnect hubs connected together is depicted with respect to of FIG. 7.

Audio Connection Devices (ACDs) are usually small boxes typically mounted close to the operators or equipment that is being tied into the system. Each ACD 16 can handle 4 to 6 audio channels, and is responsible for digitizing and mixing the audio for each channel, and interfacing with the fiber optic ring. In addition, each ACD 16 has multiple discrete inputs and outputs for controlling equipment and interfacing with operator Push-to-talk (PTT) signals. Each ACD 16 also provides multiple serial ports to interface control panels into the system.

Control panels 18 (shown best in FIG. 2B) provide the operator interface for the system, and are usually unique to each given application. There is illustrated a simple standard RS-232/RS-422 serial interfaces and a straight forward protocol for control of the system, thereby allowing the control panel to be anything from a standard "switches & knobs" type of panel to a CDU or even a computer, as desired for the given application.

The FORCE system 12 utilizes a fiber optic concentrated ring architecture, wherein the interconnect hub 14 connects multiple Audio Connection Devices 16 together to form a network. The system as illustrated can accommodate up to 256 ACDs 16 in each system. Since each ACD 16 can support multiple audio channels, the system can easily handle hundreds of audio channels.

The system operates by digitizing all signals received at a given ACD 16 and placing the digitized signals into designated timeslots in the data frames that are passed around the fiber optic ring 27. Thus, every unit on the ring has access to the signal data being received from every other unit on the ring in real time. A frame is passed around the ring 27 every 125 microseconds (8 KHz frame rate), and thus the latency from the time a signal is digitized to the time it is output to the desired channels will be 125 microseconds.

A portion of the data packets passed around the ring 27 is allocated as a message channel. The message channel is utilized by all nodes on the ring to communicate status and commands. The message channel has over 5 Mb/s of throughput, and operates at the same 8 KHz rate as the rest of the ring. Messages can be passed from control panels through the ring to remote ACDs 16, allowing any control panel to access and control any or all nodes on the system. The message channel can also be used to upload new Operational Flight Programs (OFPs) to all ACDs on the ring.

Referring to FIG. 2B, control panels 18 for the system 12 are interfaced through the nearest ACD 16, eliminating the requirement to wire all the way back to a central unit. Each ACD 16 can handle up to 4 control panels. Because every application has unique control panel requirements, the architecture of the system 12 makes no attempt to require a particular type of control panel. Instead, the architecture defines a standard RS-232/RS-422 serial interface and protocol, and the application determines how the control panel should look and behave. This interface can easily accommodate any type of control panel from a GUI-based computer to a smart CDU to the more common "switches and knobs" type control panel. The interface and protocol provided for control panels provides full access to the entire FORCE system. While the FORCE system was designed to utilize distributed control, the entire system could be controlled from a single control panel or computer attached to any ACD in the system if desired.

A DSP 36 (FIG. 4) in each ACD 16 chooses the audio channels to be mixed together based on commands and status received from the data channel 37, and places the audio on the output channel(s) 39 of the ACD 16. Because all channels are available to all nodes and mixed by software, there are no arbitrary limitations on the number of conference channels available or the connections that can be made.

The ring 27 utilizes the Synchronous Optical Network (SONET) standard for physical layer data transmission, operating at the OC-3 level (155 Mb/s). This bandwidth allows the system to handle over a thousand telephone grade audio signals, or hundreds of higher fidelity signals. SONET was developed by the telecommunications industry and forms the heart of all telecommunications call trunking and switching equipment. It is also the same standard used for ATM local area networking. Current applications of SONET have been implemented at OC-48 (2.48 Gb/s) and above, allowing for a ready upgrade path should additional bandwidth ever be desired. Because SONET technology is widely deployed for both networking and telecommunications applications, it should be widely available and supported for many years.

The concentrated ring architecture is extremely robust and easily reconfigurable. In the FORCE system 12, the interconnect hub 14 automatically adjusts to the number of ports installed in the hub 14 and the number of active units in the system by bypassing any inactive port in the interconnect hub. This architecture survives multiple ACD 16 or port failures (or equipment removals/power downs) without loss of functionality. Also, this capability precludes the need for the powered junction boxes to keep the ring 27 alive while a unit is powered off or removed.

Also, as shown in FIG. 2A, the interconnect hub 14 itself incorporates dual counter-rotating rings 17 internally to ensure that single point failures do not prevent data from moving around the ring. The interconnect hub also incorporates dual redundant load sharing power supplies and dual fans, to ensure that the system continues operating even with a power supply or fan failure.

The FORCE system 12 can handle Red/Black isolation and other Tempest security issues. Tempest guidelines require that security issues be considered from both digital and analog perspectives, to insure that classified data can not be inadvertently compromised.

From an analog perspective, the FORCE system 12 ensures that Red (classified) signals are well isolated from Black (non-classified) signals, since black signals can be broadcast to the world on any one of the various radios in a system. The usual problems occurring here are the electromagnetic coupling/crosstalk of a red signal onto a black signal in cabling and/or through the circuitry inside of a box. Tempest requires a (lower) level of separation for red-to-red situations.

Within the FORCE system 12, coupling and crosstalk can only occur between the signals being handled in a single ACD 16, since ACDs 16 have no electrical connection to each other. Several measures are taken to ensure minimizing crosstalk.

Each signal is brought into the unit on a separate connector, allowing the signal shielding to remain intact all the way into the box.

Inside the box, the signals are connected to the interface card via flex cabling, allowing separation of the signals to be repeatably maintained (this would not be easily achievable if the connectors were discretely wired).

On the interface card for the cryptos 22, each signal is handled by separate circuitry utilizing a separate ground and power plane. Physical separation is also provided between the circuitry for two channels. Where Red and Black signals can occur within a single box, (i.e., a multi-operator ACD), separate power supplies are used for each channel to provide additional isolation.

The ACD 16 removes all Red signals from the mix being sent to a headset while that headset is keyed (PTT depressed) for a Black transmission, to preclude coupling of Red audio from the headset to the microphone.

Once digitized, care must also be taken to ensure that red and black signals are kept isolated. While crosstalk and electromagnetic effects are not a significant issue in the digital domain, safeguards must be put in place to make sure that software does not accidentally mix a red signal with a black signal, or connect a red source to a black destination. The FORCE system 12 has the following safeguards to preclude these situations.

Each ACD 16 is strapped in hardware to indicate the highest security signal it is authorized to handle, and will ignore any requests to process data of a higher security level.

Each signal is tagged with an appropriate classification level when put on to the ring. In addition, each classified signal is encoded such that if accidentally mixed into an audio signal without decoding, it will be unintelligible. An ACD 16 will not tag anything to a higher level than it is authorized to handle.

Each conference is also tagged with a security level, and the ACD 16 will ignore any signals intended to be in the conference who are not at this level.

Classified signals are decoded and mixed only if 1) the ACD 16 is strapped to handle this level of data, 2) the intended conference is at that level, and 3) the data is tagged at that level.

Additional restrictions can be incorporated into the control panels 18 to ensure that the user is authorized to access a given signal.

Collectively these safeguards ensure that no single software failure causes a signal to be inadvertently compromised.

Figure 3A:
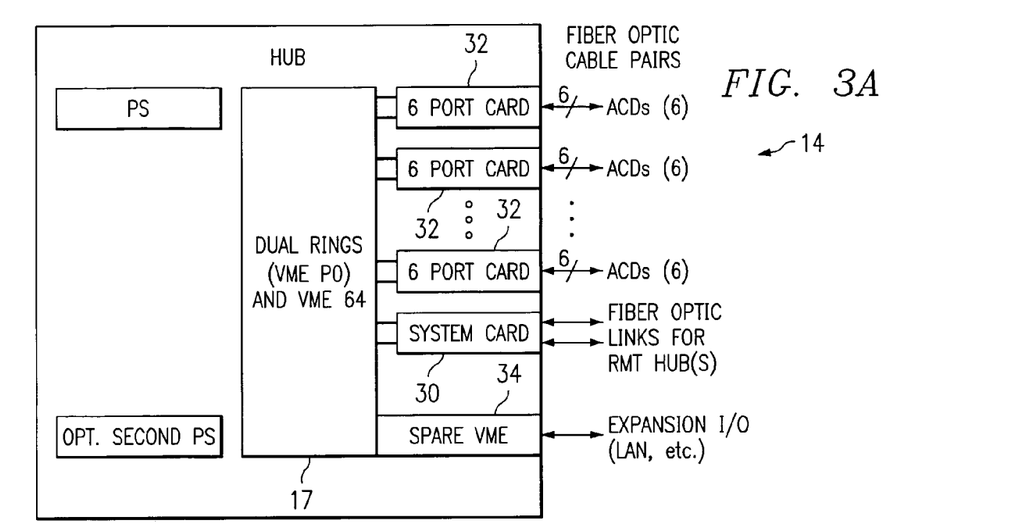
FIG. 3A is a block diagram illustrating the switch hub shown in FIGS. 2A and 2B.
Figure 3B:
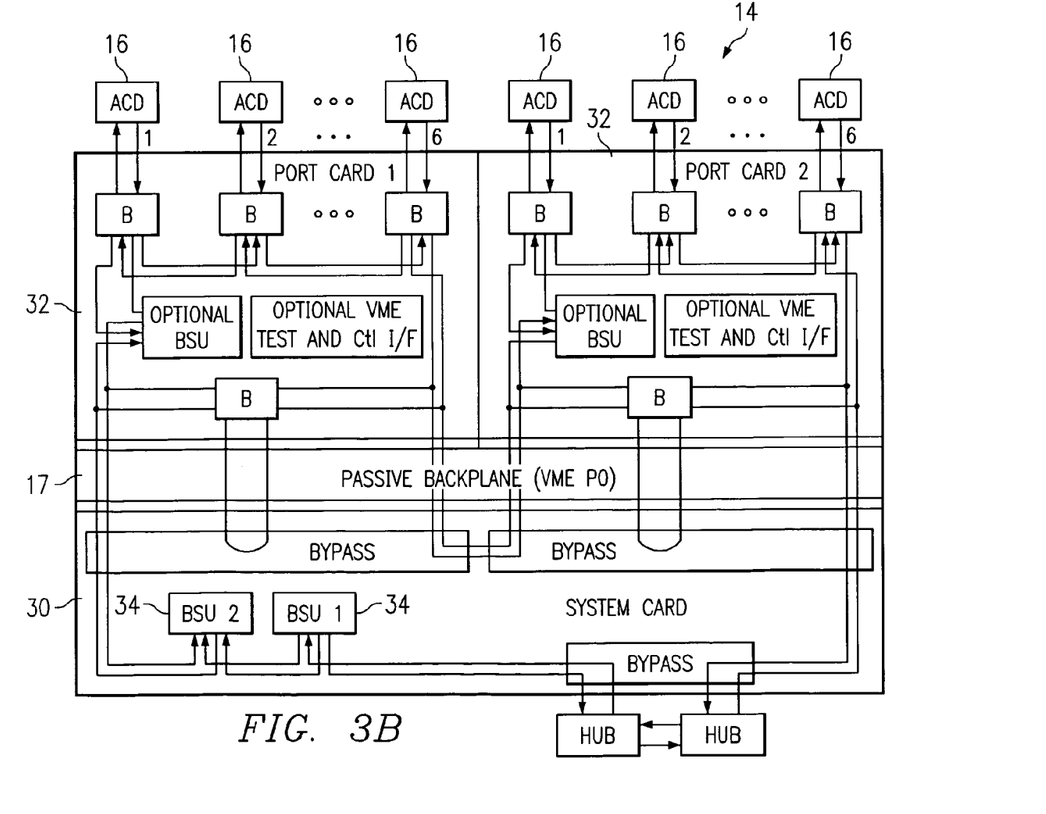
FIG. 3B is a block diagram of the switch hub of FIG. 3A, showing additional details of the hub.

FIG. 3A is a block diagram illustrating interconnect hub 14 of FIGS. 2A and 2B, FIG. 3B is also a block diagram of hub 14, illustrating additional details. The interconnect hub 14 is a standard ¾ ATR tall long chassis that houses an 8 slot VME-64 card cage, dual redundant power supplies and dual fans.

Cards plugged into the card cage provide the functionality of the interconnect hub 14. The chassis houses one system card 30 and up to 6 port cards 32. One slot 34 is spare, available for any unique application needs. Front panel connectors include a hub expansion connector and three (3) ACD fiber connectors. Each of the ACD connectors provides access to 12 pairs of standard 62.5/125 multimode fiber, allowing up to 12 ACDs 16 to be connected to an ACD connector. Additional details of and connection within system card 30 and port card 32 are illustrated in FIG. 2B and described in greater detail below in conjunction with FIGS. 4, 5A, and 5B.

Figure 4:
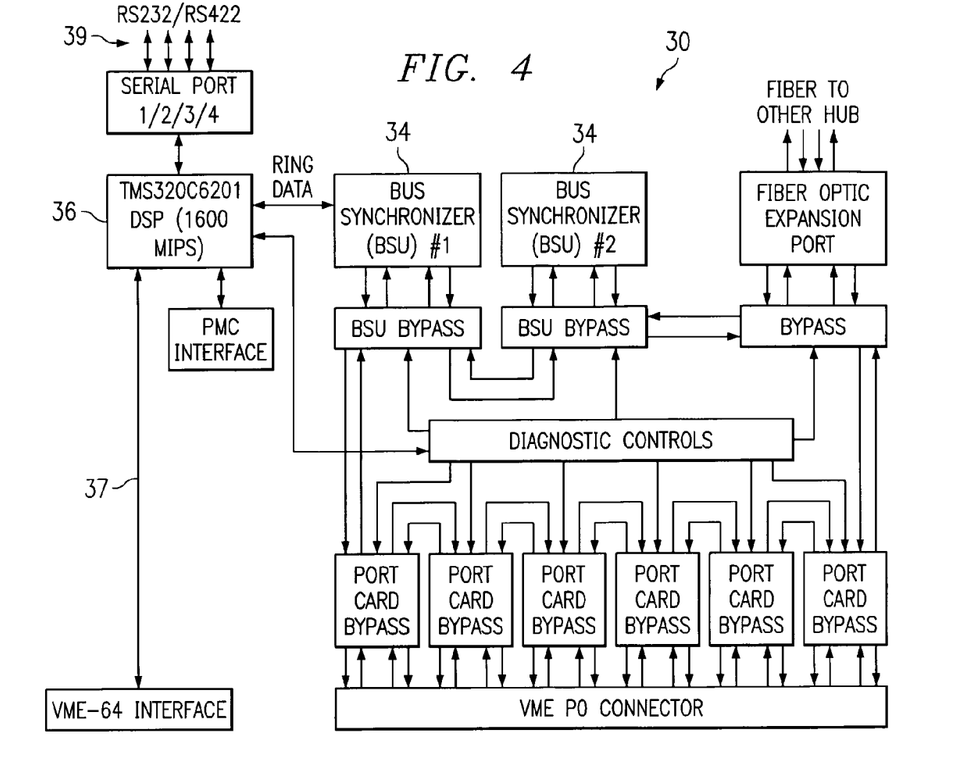
FIG. 4 is a block diagram illustrating the system and card shown in FIGS. 3A and 3B.

FIG. 4 is a high level block diagram illustrating system card 30 of FIGS. 3A and 3B. The system card 30 provides several capabilities for operation of the FORCE system 12. The primary function of the system card 30 is to electrically connect the fiber rings from all the port cards 32 in the chassis to each other bypassing any port card slots that are not in use. The bus synchronizer (BSU) 34 functions to maintain the 8 KHz frame rate of the ring and minimizes stale data from the ring. Because the ring can not operate without a BSU 34, the system card actually provides dual redundant BSUs.

The system card also includes a DSP 36 (the same one used in the ACDs). This processor is not required for normal operation of the system, and is provided to perform diagnostic (BIT) functions for the interconnect hub 14. Since the processor has full access to the ring data, as well as to the VME bus within the interconnect hub chassis, the DSP 36 can also be used to provide access to data on the ring from any card on the VME bus. This is used to satisfy unique application requirements.

Figure 5A:
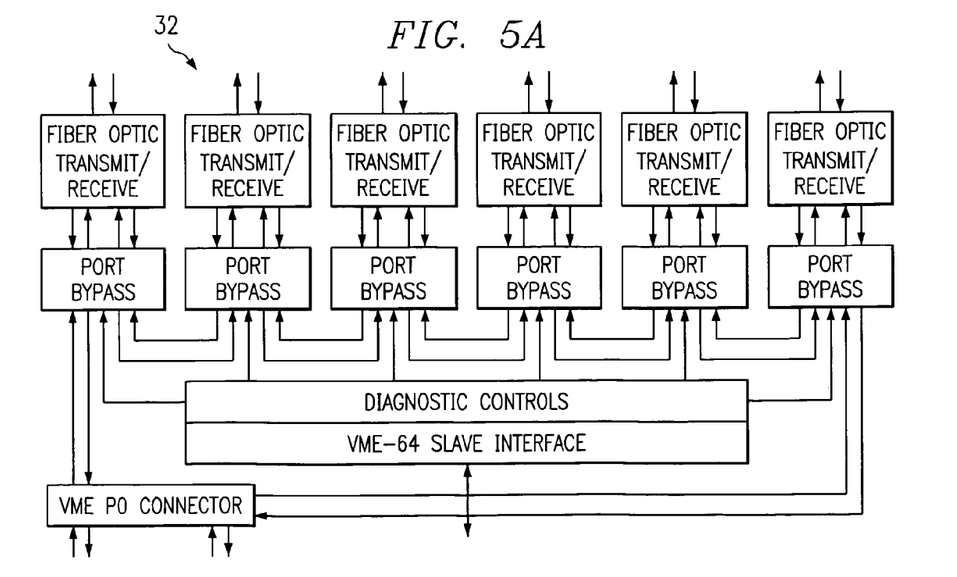
FIG. 5A is a block diagram illustrating the port card shown in FIGS. 3A and 3B.
Figure 5B:
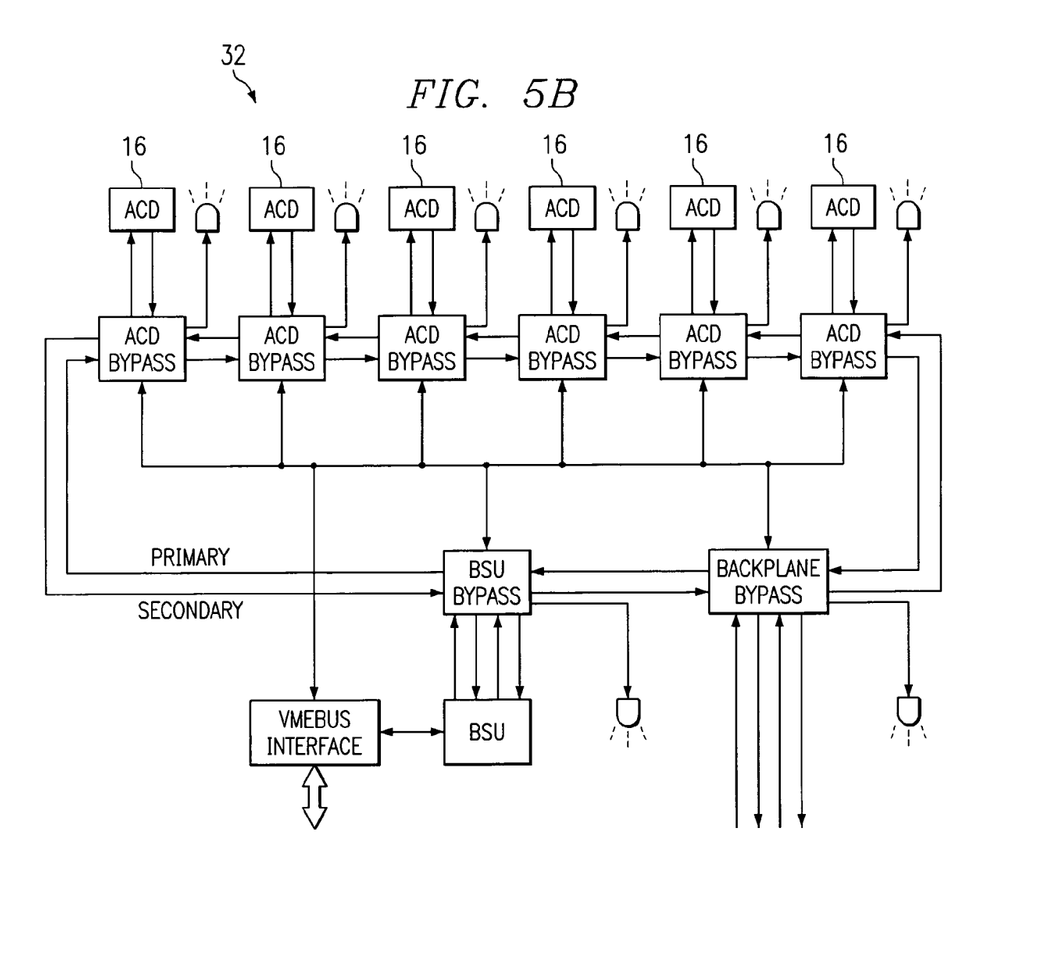
FIG. 5B is a block diagram of the port card of FIG. 5A, showing additional details of the port card.

FIGS. 5A and 5B are block diagrams illustrating port card 32 of FIGS. 3A and 3B. A port card 32 interfaces up to 6 ACDs 16 into the system and can be installed into any of the 6 port card slots in the hub chassis allowing for the connection of up to 36 ports into a single hub. Each port monitors the incoming signals from the ACD 16 and neighboring ports for signal activity, and will take corrective action on detection of a failure. If the signal coming from an ACD 16 fails (optical carrier or clock is lost) that ACD 16 will be bypassed. This situation can happen when an ACD 16 fails or when powered off. In any event, if the signal returns, the connection to the ACD 16 is restored.

If the signal from a neighboring port 32 fails, the port will activate a secondary ring to loop around the failed port. The port circuit on either side of the failed unit loops the primary ring to the secondary ring, thus cutting the failed port out of the ring.

Figure 6:
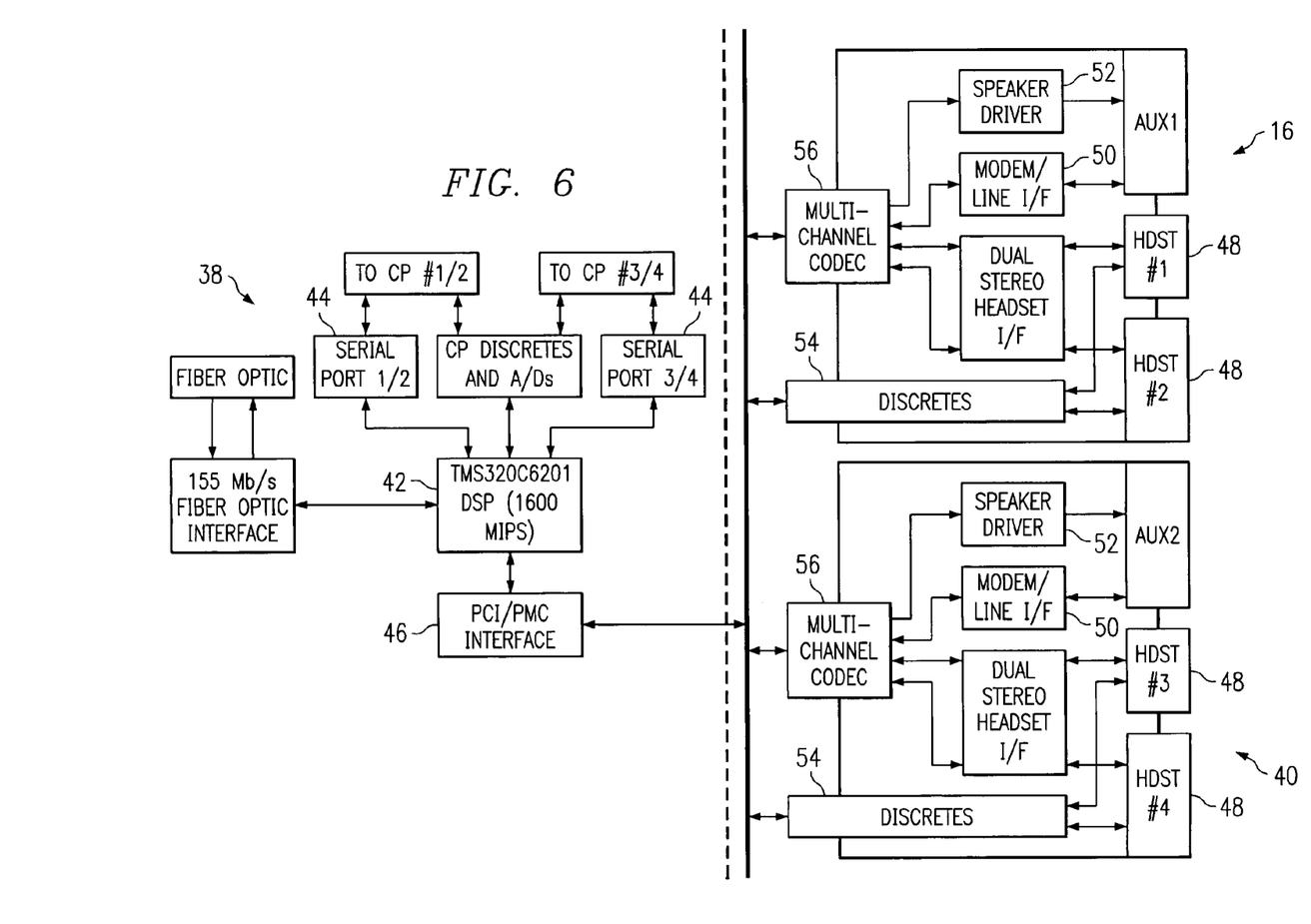
FIG. 6 is a block diagram illustrating the digital card and the headset card of the audio connection device shown in FIGS. 2A and 2B.
Figure 7:
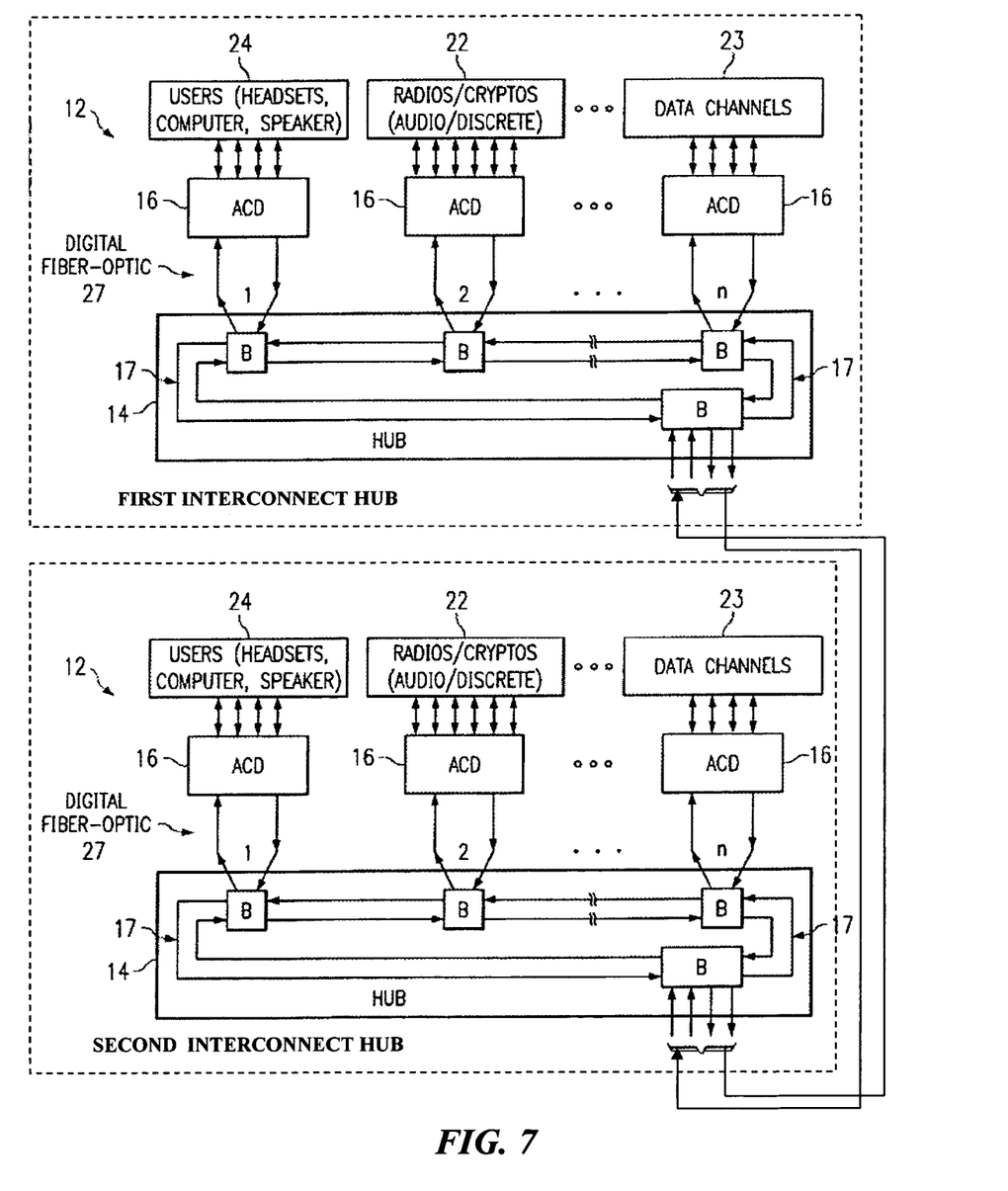
FIG. 7 is a block diagram illustrating multiple switching systems of FIG. 2A and their respective interconnect hubs being connected together.

FIG. 6 is a block diagram illustrating the audio connection device 16 of FIG. 2A, including a digital card 38 and a headset interface card 40. ACD 16 is the workhorse of the FORCE system 12. It has the responsibility of digitizing the analog inputs for transmission on to the fiber optic ring 27 and the mixing and processing of the digital data from the ring 27 to create the specified audio outputs.

The ACD 16 physically consists of two circuit cards, the digital card 38 and the interface card 40. Digital card 38 contains the TMS320C6201 DSP 42 (200 MHZ, 1600 MIP), the power supply for the ACD, and all circuitry required to interface to the fiber optic ring 27. Also comprising the digital card 38 are 4 serial ports 44 for interfacing with control panels or other equipment, 2 MB of EEPROM for program memory, and 32 KB of non-volatile memory for storage of configuration and fault data. In addition, the digital card 38 contains an industry standard PCI Mezzanine Card (PMC) 46, hosting the interface card for the ACD 16. This PMC 46 can be used for one of the custom interface cards or can be populated with any commercial off-the-shelf (COTS) PMC card (1553, T-1, ISDN, Video, etc.) The digital card 38 is common to all ACDs 16.

The interface card 40 varies depending on the intended use of the particular ACD 16. Several types of interface cards may be used, such as a headset interface card (illustrated) and an equipment interface card. These cards are further described below.

The headset interface card 40 is specifically designed to handle all of the interfaces that are likely to be associated with an operator. The headset card is nominally intended to service two operators, each with a slaved spare headset connection. Each operator then also has a speaker interface and auxiliary line/modem interface. Each of the headset interfaces is separately digitized, and therefore can be utilized as four separate operator interfaces if spare headset connections are not required.

The headset card provides four independently controllable stereo or mono headset interfaces 48. The card can be configured to use powered or unpowered microphones, each with independent automatic gain control (AGC). Independent Voice Operated Transmission (VOX) capability for each channel is provided digitally by the DSP. A total of 8 input discretes 54 are provided to handle multiple Push-To-Talk (PTT) inputs and two independent speaker channel drivers 52 are provided for driving a 3 volt signal into a 150 to 600 ohm speaker. Two auxiliary channel modems 50 are provided which can be independently switched under program control between a standard line level (1 Vrms) signal suitable for interface to a computer or other COTS audio equipment, or a standard 2 wire phone interface, suitable for connection to a computer modem or standard telephone. Independent circuitry powered from a separate 28 VDC power input is provided to connect headset #1 to an emergency audio port. The emergency audio port is a standard 600 ohm audio interface with an associated PTT signal. This port is operable anytime the emergency power is available, whether or not the rest of the ACD 16 is powered. It is activated via an emergency input discrete 54.

All audio channels utilize independent CODEC channels 56, and audio bandwidths from 4 KHz to 24 KHz can be supported. Headsets #1 and #2 and associated circuitry utilize a separate power source from headsets #3 and #4 and circuitry associated therewith to provide the isolation required for red/black separation between these channels. The emergency circuitry is powered from a third power source.

The interface card 40 is designed to handle standard radio and cryptographic equipment. Because of the flexibility inherent in the design of the interface card, it can also interface most other special purpose equipment that may be called for in any given situation.

The card is configurable to handle bandwidths up to 40 KHz, balanced or unbalanced lines, and a 135 to 600 ohm impedance. Four ports are provided per card, each with 4 input and 4 output discretes 54 for configuration and control of the connected equipment. Each interface is provided with a circular connector for quick connect/disconnect. All signal lines to and from the interface card 40 have built in surge/HERF protection.

Because the mechanical and electrical connection to the interface card 40 utilizes the industry standard PMC specification, the ACD 16 accepts COTS PMC cards to provide special purpose interface capabilities to the system. PMC cards are readily commercially available to handle standard interfaces such as MIL-STD-1553, ARINC-429, and many telecom interfaces (T-1/E-1 and ISDN, for example).

Technical Specification Summary

Below is a table summarizing technical specifications for components of one embodiment of the invention; however, other specifications may be utilized without departing from the scope of the present invention.

TABLE 1

Technical Specification Summary
Force System Specifications

| Interconnect HUB 32 Specifications (3/4 ATR Version) | | |
|---|---|---|
| Power Requirement: | AC - 115 VAC, 47 to 440 Hz @ 180 watts | |
| Size: | ¾ ATR, tall, long,, | |
| Fiber: | SONET, OC-3, 155 Mb/s | |
| Backplane: | VME 64, 8 slots | |
| System Card | | |
| Power: | 30 watts | |
| Size: | VME 64, 6U | |
| Port Card | | |
| Power: | 30 watts | |
| Size: | 6U VME | |
| ACD 16 Specifications | | |
| Power Requirement: | DC - 18 to 32 VDC @ 18 watts | |
| Size: | 6.75" W × 7.5" L × 2.0" H | |
| Headset Interface: | | |
| Microphone | Bias | M-7A, M-7/DC, M-1/DC |
| | Unbias | M-87, M-101 |
| Hdst - | Mono: | 8 to 600 ohms |
| | Stereo: | 8 to 300 ohms |
| Loud Speaker I/F | 150 to 600 ohms | |
| Line Interface: | Out - | 600 ohm, 1 Vrms |
| | In - | 600 ohm, 1 Vrms |
| Equipment Interface: | Out - | 135 to 600 ohms, 5 Vrms |
| | In - | 135 to 600 ohms, 5 Vrms |
| Digital Card | | |
| DSP: | TMS320C6201 | 200 MHZ, 1600 Mip |

TABLE 1-continued

Technical Specification Summary
Force System Specifications

| | |
|---|---|
| Fiber: | SONET, OC-3 level |
| Program Memory: | 2 Mbytes Eeprom |
| Configuration Memory: | 32 kbytes, non-volatile |

Although the present invention has been described with reference to several embodiments, changes and modifications may be suggested to one skilled in the art, and it is intended that the present invention encompass such changes and modifications as fall within the scope of the present appended claims.

What is claimed is:

1. A digital, fiber optic switching and distribution system, comprising:

a first fiber optic concentrated logical ring configured as a physical star communication network to a plurality of signal sources;

a first plurality of connection devices coupled to the first fiber optic concentrated logical ring, each of the first plurality of connection devices receiving analog signals from a plurality of signal sources and converting the received analog signals into digital data signals;

a first central hub coupled to provide the center of the physical star communication network for the first fiber optic concentrated logical ring and receiving the digital data signals for routing to the first plurality of connection devices;

a second fiber optic concentrated logical ring configured as a physical star communication network to a plurality of signal sources;

a second plurality of connection devices coupled to the second fiber optic concentrated logical ring, each of the second plurality of connection devices receiving analog signals from a plurality of signal sources and converting the received analog signals into digital data signals; and a second central hub coupled to provide the center of the physical star communication network for the second fiber optic concentrated logical ring and receiving digital data signals for routing to the second plurality of connection devices, the second central hub coupled to the first central hub as a signal fiber optic switching and distribution system;

wherein the first and second plurality of connection devices are configured to provide communications among a plurality of signal sources;

wherein the first and second central hubs comprise a ring network connecting a plurality of fiber optic network connections coupled to the plurality of connection devices; and wherein the first and second central hubs are configured to communicate the digital data signals to each of the audio connection devices in the ring using synchronous time division multiplex access (TDMA) communications.

2. The digital, fiber optic switching and distribution system as in claim 1 further comprising:

a plurality of additional fiber optic concentrated logical rings each configured as a communication network to a plurality of signal sources;

a plurality of additional pluralities of connection devices, each of the additional plurality of connection devices coupled to one of the additional fiber optic concentrated rings, each of the additional plurality of connection devices receiving analog signals from a plurality of signal sources and converting the received analog signals into digital data signals; and a plurality of additional central hubs individually coupled to provide the center of the physical star communication network for one of the additional plurality of fiber optic concentrated logical rings and receiving digital data signals for routing to the connection devices, each additional central hub coupled to at least one central hub as a signal fiber optic switching and distribution system.

3. The digital, fiber optic switching and distribution system as in claim 1 wherein the first and second central hubs each comprises dual counter-rotating fiber optic rings for a single point failure protection.

4. The digital, fiber optic switching and distribution system as in claim 1 further comprising a first plurality of control panels individually coupled to one of the first plurality of connection devices; and a second plurality of control panels individually coupled to one of the second plurality of connection devices.

5. The digital, fiber optic switching and distribution system as in claim 4 wherein each of the first and second plurality of control panels has access to each of the first and second plurality of connection devices.

6. The digital, fiber optic switching and distribution system as in claim 1 wherein the first and second fiber optic concentrated rings each comprises a plurality of subloops equal in number to at least the plurality of first or second connection devices, respectively.

7. The digital, fiber optic switching and distribution system as in claim 6 wherein the first and second central hubs each comprises a plurality of ports individually coupled to a subloop of the first or second fiber optic concentrated ring, respectively.

8. The digital, fiber optic switching and distribution system as in claim 1 wherein each of the first and second plurality of connection devices comprises a digital signal processor for selective mixing of signals received from the at least one signal source.

9. The digital, fiber optic switching and distribution system as in claim 1 wherein the first and second central hubs each further comprises a bus synchronizer for synchronizing the routing of data frame through the respective first or second fiber optic concentrated ring.

* * * * *